United States Patent [19]
Andrighetti

[11] Patent Number: 5,471,487
[45] Date of Patent: Nov. 28, 1995

[54] STACK READ/WRITE COUNTER THROUGH CHECKING

[75] Inventor: Robert H. Andrighetti, Woodbury, Minn.

[73] Assignee: Unisys Corporation, Blue Bell, Pa.

[21] Appl. No.: 233,232

[22] Filed: Apr. 26, 1994

[51] Int. Cl.⁶ .................................................. G06F 11/00
[52] U.S. Cl. ......................................................... 371/57.1
[58] Field of Search .................................. 371/51.1, 57.1, 371/40.1; 365/78, 189.04, 221, 189.01

[56] References Cited

U.S. PATENT DOCUMENTS

| | | | |
|---|---|---|---|
| 4,175,287 | 11/1979 | Fuhrman | 371/57.1 |
| 4,507,760 | 3/1985 | Fraser | 365/221 |
| 4,692,893 | 9/1987 | Casper | 371/51.1 |
| 4,833,651 | 5/1989 | Seltzer et al. | 365/189.07 |
| 4,933,932 | 6/1990 | Quinquis et al. | 370/60 |
| 5,210,749 | 5/1993 | Firoozmand | 370/85.1 |
| 5,267,191 | 11/1993 | Simpson | 365/78 |
| 5,274,647 | 12/1993 | Tanaka | 371/57.1 |

Primary Examiner—Hoa T. Nguyen
Assistant Examiner—Joseph E. Palys
Attorney, Agent, or Firm—Nawrocki, Rooney & Sivertson

[57] ABSTRACT

An apparatus for efficiently detecting an error on a memory stack write pointer or a memory stack read pointer by continuously monitoring the relative position between the two pointers. Using this technique, the present invention may detect certain classes of errors that cannot be detected by other error detection methods such as redundancy. The present invention eliminates the need to provide full redundancy thereby potentially saving considerable cost, size and power in a typical computer system.

22 Claims, 4 Drawing Sheets

STACK READ/WRITE COUNTER THROUGH CHECKING

BACKGROUND OF THE INVENTION

1. Field of the Invention

The present invention is generally related to digital computers that utilize read and write pointers to access a memory element and more particularly relates to means for checking the validity of the read and write pointers.

2. Description of the Prior Art

A key element in the design of high reliability computer systems is error detection. The term "error detection" refers to the detection of errors within a computer system before the errors adversely affect the arithmetic operations within the computer system. Many of today's computer systems incorporate some form of error detection to achieve improved reliability.

Large scale error detection has proved to be expensive to implement and maintain. In response thereto, many computer designers are limiting the use of error detection to portions of the computer system that can provide the most benefit. Memory elements are historically one place where error detection is targeted. Errors that occur either internal to a memory element or adjacent to the inputs or outputs of a memory element are far more likely to adversely affect the arithmetic operations within the computer system than those that occur in combinational logic. Memory elements must "store" data for later use whereas combinational logic merely operates on data in real time.

A specific type of memory element that is of interest is a memory stack. A memory stack is a number of memory locations that may be accessed via an address bus. A read/write memory stack employs two address busses which are typically called pointers. The read/write memory stack has a read pointer and a write pointer. A memory controller within the computer system may control the read pointer and the write pointer such that only valid data is written to the memory stack and only valid data is read from the memory stack. In a typical system, the memory controller may write one or more data words into a series of address locations using the write pointer. At a later time, the memory controller may read the previously written data elements using the read pointer.

In one type of read/write memory stack, called a first-in-first-out (FIFO) stack, the write pointer is incremented as data is written into the stack. Similarly, when reading the stack, the read pointer is incremented through the same memory locations as the write pointer passed through and in the same order, thus causing the first data element that is written to the FIFO stack to also be the first element that is read from the FIFO stack. The memory controller may not allow the read pointer to be incremented past the write pointer thus preventing invalid data from being read from the memory stack.

The absolute address location that is written or read via the write and read pointers is not important in a FIFO stack configuration. Rather, the relative difference between the write pointer and the read pointer is what defines valid data. The write and read pointers are typically generated by counters whereby the counters have a predetermined width. The width of the counters are selected such that counters have the same number of states as the corresponding memory element. In this way, the counters can be incremented such that the pointer address travels from a zero address to the maximum address of the memory element and then back to the zero address.

The memory controller may provide protection for preventing the write pointer from being incremented into data that has not yet been read. This is termed a "stack full" condition. When a stack full condition is detected, the memory controller must read data from the memory stack before further data can be written into the stack.

One method for providing error detection within a system is termed "parity". Parity is a method for detecting errors whereby one additional "parity bit" is added to each data word in a memory element. For example, in a 16 bit data word, one additional "parity bit" may be added to each data word thereby resulting in a 17 bit data word that must be stored in memory. Parity is defined as either "odd" parity or "even" parity. The parity bit may be set by a parity generator such that the total number of 1's in a data word is an even number for an "even" parity system. Conversely, the parity bit may be set by the parity generator such that total number of 1's in the data word is an odd number for an "odd" parity system. When the data word is later read from the memory, the parity generator regenerates the parity bit for the data word that is read from memory and is compared to the originally stored parity bit. If there is a difference, an error is detected.

A single parity bit per data word can detect if a single data bit in a data word flips from one state to another. However, A single parity bit per data word may not be able to detect if more than one bit within a data word flips from one state to another. For example, if two bits within a data word flip from one state to another, the value of the parity bit of the corrupted data word will remain the same as the value of the parity bit of the originally stored data word. Therefore, one parity bit per data word may only allow the detection of a single bit flip within a given data word. To detect multiple bit flips per data word, various numbers of parity bits must be added to each data word depending on the parity generation technique used. In systems that have large arrays of memory elements with potentially hundreds of thousands of data words, it can readily be seen that the parity technique for detecting errors within a computer system can be costly to implement and can require a relatively high level of overhead.

Another technique for performing error detection in a system is to provide redundancy. Redundancy provides duplicate circuits in critical areas of the computer system. The inputs of a duplicate circuit may be tied to a corresponding input of a primary circuit. The output of the duplicate circuit is then compared to the output of the primary circuit during system operation. If there is a difference, an error flag may be set. When utilizing this technique, it is assumed that if both circuits produce the same result, both circuits are operating properly and therefore no error has occurred.

In some systems, three or more identical circuits are provided and the outputs of the circuits are connected to a voting circuit. The voting circuit compares the outputs of the identical circuits and provides an output that is consistent with the majority of the circuits. With either of these redundancy techniques described above, it is readily apparent that both can be costly to implement and can require a relatively high level of overhead.

The FIFO stack memory element referred to above may employ either the parity technique or the redundancy technique or a combination thereof to provide error detection for the memory element itself. However, a particular concern for this type of memory element is the integrity of the read pointer and the write pointer. If an error occurs on either the read pointer or the write pointer, the error will in all probability be propagated into the computer system. As previously stated, the read and write pointers are typically controlled by a memory controller circuit. It can be critical that the memory controller circuit have error detection designed therein. In a typical system, the read pointer and the write pointer will each be controlled by a counter and other peripheral circuitry.

To detect errors in the read and write pointers, a duplicate set of pointer/counters may be provided in addition to the primary set. When a primary read counter is incremented, a duplicate read counter may also be incremented. Similarly, when a primary write counter is incremented, a duplicate write counter may also be incremented. A first comparator may be coupled to the outputs of the primary and the duplicate read counters and a second comparator may be coupled to the output of the primary and duplicate write counters. If either the first comparator or the second comparator detects that the primary counter differs from the duplicate counter, an error signal may be generated.

Although the error detection methods discussed above may provide some level of error protection, they cannot detect certain classes of errors that may occur on the read and write pointers. For example, if an error condition causes both the primary and duplicate read counters to increment, the error may go undetected. This may not be as unlikely as it first might seem because typically the respective inputs of the primary and duplicate counters are tied together. Therefore if an error occurs on an input signal to the counters, both the primary and duplicate counters may propagate the error. For example, if a glitch occurs on an ENABLE or a COUNT input to the counters, both counters may inadvertently increment. This error may eventually be returned to the computer system in a stack read operation.

SUMMARY OF THE INVENTION

The present invention overcomes the disadvantages found in the prior art by providing a means for detecting an error on a write pointer or a read pointer by continuously monitoring the relative position between the two pointers. Using this technique, the present invention may detect certain classes of errors that may not be detected by the error detection schemes discussed above. In addition, the present invention eliminates the need to duplicate the read and write counters and the need for their associated comparators thereby potentially saving considerable system cost, size and power.

One embodiment of the present invention comprises a tracking counter which tracks the relative difference between the position of the write pointer and the position of the read pointer. This relative difference can be compared to a programmable maximum offset value to determine if the relative positions of the read pointer and write pointer exceed a predefined limit.

Since the relative difference between the read pointer and the write pointer plus the read pointer value should equal the write pointer value, the relative difference provided by the tracking counter may be added to the read pointer to obtain an "expected" write pointer value. The "expected" write pointer value can be compared to the actual write pointer value to determine if an error has occurred. If the expected write pointer value exceeds the actual write pointer value, an over-run fault may be issued. In any event, if the "expected" write pointer value does not equal the actual write pointer value, a pointer fault may be issued.

In an exemplary embodiment of the present invention, the tracking counter may increment every time the write pointer increments. Similarly, the tracking counter may decrement every time the read pointer increments. The tracking counter thereby tracks the difference between the write pointer and the read pointer. As can readily be seen, when no errors exist the tracking counter value plus the read counter will equal the write pointer value as discussed above.

The tracking counter of the exemplary embodiment may have the capability to increment and decrement within the same clock cycle. This may be accomplished by incrementing the tracking counter on the first half of the cycle and decrementing the tracking counter on the second half of the cycle. It is also contemplated that the tracking counter could be decremented on the first half of the cycle and incremented on the second half of the cycle.

The exemplary embodiment of the present invention may require the addition of one tracking counter and one comparator. The redundancy approach discussed above requires at least two redundant counters and two redundant comparators. Therefore, the present invention may require much less overhead, power, and physical space to be implemented than a redundancy approach. However, it is contemplated that the present invention may be combined with a parity scheme and/or a redundancy approach to further improve the error detection effectiveness of a system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
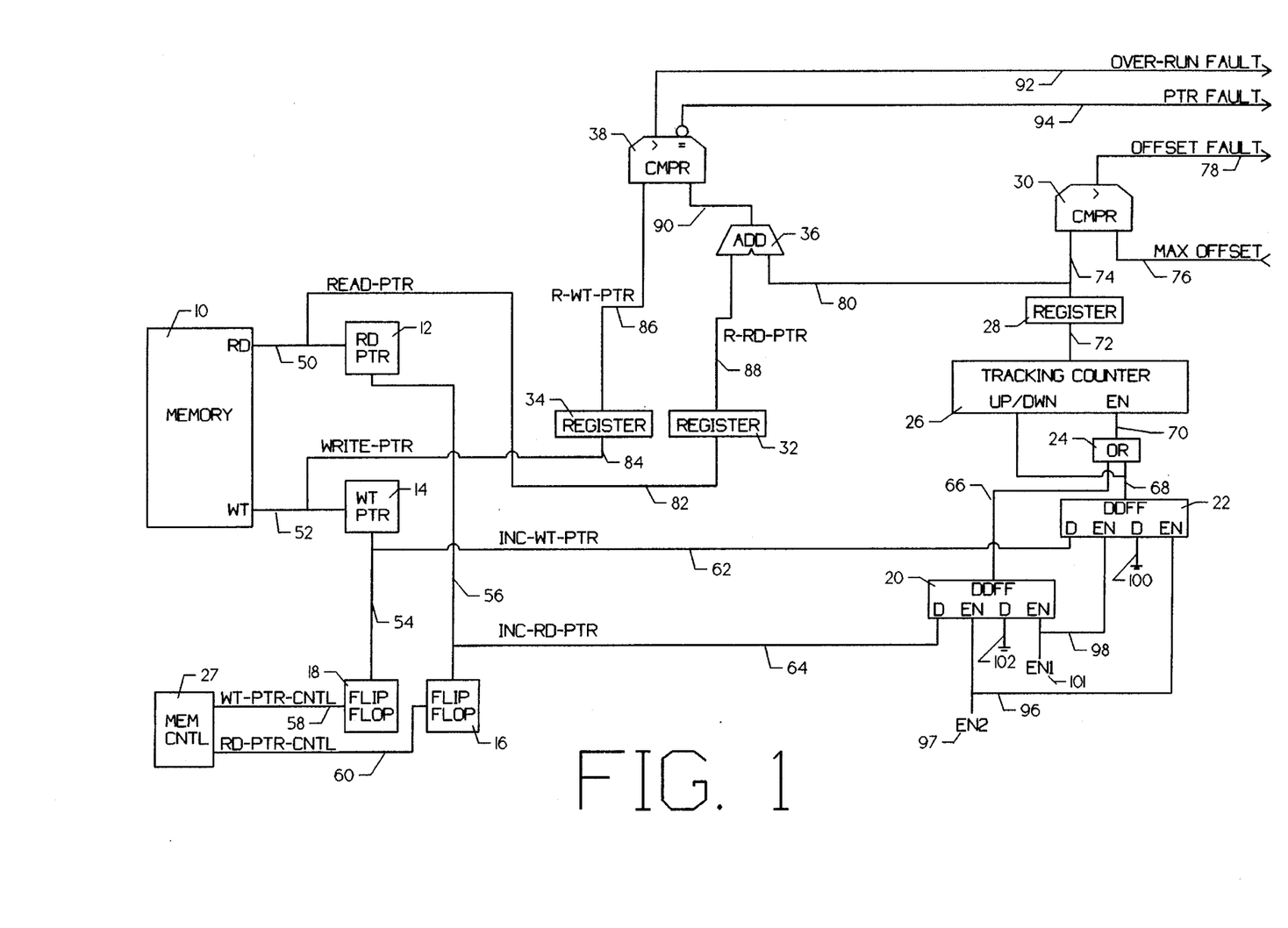
FIG. 1 is a block diagram of an exemplary embodiment of the stack read/write counter through checking circuit of the present invention.

FIG. 1 is a block diagram of an exemplary embodiment of the stack read/write counter through checking circuit of the present invention. As stated above, an exemplary embodiment of the present invention can check the integrity of a read pointer and a write pointer in a stack memory configuration. It is recognized that the present invention is applicable to any memory having more than one access pointer.

In the exemplary embodiment of FIG. 1, MEM-CNTL 27 controls the operation of the read pointer and the write pointer. MEM-CNTL 27 is coupled to flip-flop 18 via interface WT-PTR-CNTL 58 and further coupled to flip-flop 16 via interface RD-PTR-CNTL 60. MEM-CNTL 27 may set flip-flop 18 to increment the write pointer. Similarly, MEM-CTRL 27 may set flip-flop 16 to increment the read pointer. It is contemplated that MEM-CTRL 27 may simultaneously set flip-flop 18 and flip-flop 16 thereby incrementing both the write pointer and the read pointer.

Flip-flop 18 is coupled to WT-PTR 14 via interface 54. WT-PTR 14 generates the write pointer for use by a memory 10. WT-PTR 14 may be a counter which may be incremented by setting INC-WT-PNTR 54. WT-PTR 14 is coupled to memory 10 via interface 52. When flip-flop 18 is set by MEM-CNTL 27, WT-PTR 14 increments the write pointer value. Similarly, flip-flop 16 is coupled to RD-PTR 12 via interface 56. RD-PTR 12 generates the read pointer address for memory 10. RD-PTR 12 may be a counter which may be incremented by setting INC-RD-PNTR 56. RD-PTR 12 is coupled to memory 10 via interface 50. When flip-flop 16 is set via MEM-CNTL 27, RD-PTR 12 may increment the read pointer value. MEM-CNTL 27 controls the operation of the write pointer and the read pointer such that valid data may be written and read from memory 10.

Flip-flop 18 is coupled to dual data flip-flop 22 via interface 62. Dual data flip-flop 22 may comprise two independent storage elements each having independent enable and data input ports. The outputs of the two independent storage elements may be coupled together at interface 68. Flip-flop 18 is coupled to the data input of a first storage element within dual data flip-flop 22. The data input of a second storage element within dual data flip-flop 22 is coupled to ground in the preferred embodiment. The enable port of the first storage element within the dual data flip-flop 22 is coupled to an EN1 port 101 via interface 98. The enable port of the second storage element within dual data flip-flop 22 is coupled to an EN2 port 97 via interface 96. In the exemplary embodiment, a dual data flip-flop 22 is utilized so that a tracking counter 26 may be decremented in a first half of a clock cycle and incremented in a second half of a clock cycle. The operation of, and reasons for utilizing the dual data flip-flop 22, will become clear later.

Flip-flop 16 is coupled to dual data flip-flop 20 via interface 64. In the exemplary embodiment, dual data flip-flop 20 is substantially the same as dual data flip-flop 22. Dual data flip-flop 20 may comprise two independent storage elements wherein the outputs of the two storage elements may be coupled together at interface 66. Flip-flop 16 is coupled to the data input of a first storage element within dual data flip-flop 20. The data input of the second storage element in dual data flip-flop 20 may be coupled to ground in the preferred embodiment. The enable input of the first storage element within dual data flip-flop 20 is coupled to EN2 port 97 via interface 96. The enable port of the second storage element within dual data flip-flop 20 is coupled to EN1 port 101 via interface 98.

In the exemplary embodiment, EN2 port 97 enables the first storage element within dual data flip-flop 20 and the second storage element within dual data flip-flop 22. A controller circuit may force EN2 port 97 active during a first half of a clock cycle. As a result, dual data flip-flop 22 may impose a logic zero on interface 68 and dual data flip-flop 20 may impose the value contained in flip-flop 16 on interface 66 during a first half of a clock cycle.

During the second half of a clock cycle, a controller circuit may force the EN1 port 101 active and the EN2 port 97 inactive. This may enable the second storage element within dual data flip-flop 20 and the first storage element within dual data flip-flop 22. In the exemplary embodiment, dual data flip-flop 20 imposes a logic zero on interface 66 during the second half of the cycle. Dual data flip-flop 22 imposes the value contained in flip-flop 18 on interface 68 during the second half of the clock cycle.

Dual data flip-flop 20 is coupled to OR-GATE 24 via interface 66. Dual data flip-flop 22 is coupled to OR-GATE 24 via interface 68. OR-GATE 24 is coupled to the enable input of tracking counter 26 via interface 70. An up/down input port of tracking counter 26 is coupled to the output port of dual data flip-flop 22 via interface 68. In this configuration, tracking counter 26 is enabled during the first half of the clock cycle if flip-flop 16 is set. As discussed above, dual data flip-flop 22 may impose a logic zero on interface 68 during the first half of the clock cycle thus causing the up/down input port of tracking counter 26 to be a logic low. In the exemplary embodiment, when the up/down input port of tracking counter 26 is a logic low, tracking counter 26 counts down. Similarly, when the up/down input port of tracking counter 26 is a logic high, tracking counter 26 counts up. Therefore, during the first half of the clock cycle, tracking counter 26 is enabled and counts down if flip-flop 16 is set via MEM-CNTL 27.

During the second half of the cycle, dual data flip-flop imposes the value contained in flip-flop 18 onto interface 68. As a result, if flip-flop 18 is set by MEM-CNTL 27, tracking counter 26 will be enabled via OR-GATE 24 and will count up.

In the exemplary embodiment, tracking counter 26 is incremented when the write pointer is incremented via INC-WT-PTR 54. Similarly, tracking counter 26 is decremented when the read pointer is incremented via INC-RD-PTR 56. Therefore, tracking counter 26 may keep track of the difference between the read pointer and the write pointer. Dual data flip-flop 20 and dual data flip-flop 22 allow tracking counter 26 to handle the situation where both the read pointer and the write pointer are incremented in the same clock cycle. However, it is not necessary for the operation of the exemplary embodiment that the read pointer and the write pointer be active during the same clock cycle.

Tracking counter 26 is coupled to register 28 via interface 72. Register 28 is coupled to comparator 30 via interface 74. Comparator 30 compares the value contained in register 28 with a programmable maximum offset value imposed by a controller circuit on interface 76. If comparator 30 determines that the value contained in register 28 is larger than the maximum offset value imposed on interface 76, an offset fault is imposed on interface 78. Comparator 30 allows the user to detect when the write pointer and the read pointer differ by more than a maximum programmable offset value.

Register 28 is also coupled to a first input of adder 36 via interface 80. A second input of adder 36 is coupled to a register 32 via interface 88. Register 32 is further coupled to READ-PTR 12 via interface 82. Adder 36 adds the value generated by tracking counter 26 to the corresponding read pointer value generated by RD-PTR 12 and imposed on READ-PTR 82. Adder 36 is coupled to a first input of a comparator 38 via interface 90. A second input of comparator 38 is coupled to a register 34 via interface 86. Register 34 is coupled to WRITE-PTR 14 via interface 84. Comparator 38 compares the output of adder 36 with the corresponding write pointer value produced by WT-PTR 14 and imposed on WRITE-PTR 84. If comparator 38 determines that the output of adder 36 is not equal to the contents of register 34, comparator 38 issues a pointer fault on interface 94. In addition, if comparator 38 determines that the output of adder 36 is larger than the write pointer contained in register 34, comparator 38 issued an over-run fault on interface 92.

It is contemplated that registers 28, 32, and 34 may be omitted from the exemplary embodiment and still obtain similar results. It is also recognized that the present invention may be implemented in other ways other than the exemplary embodiment of FIG. 1.

Figure 2A:
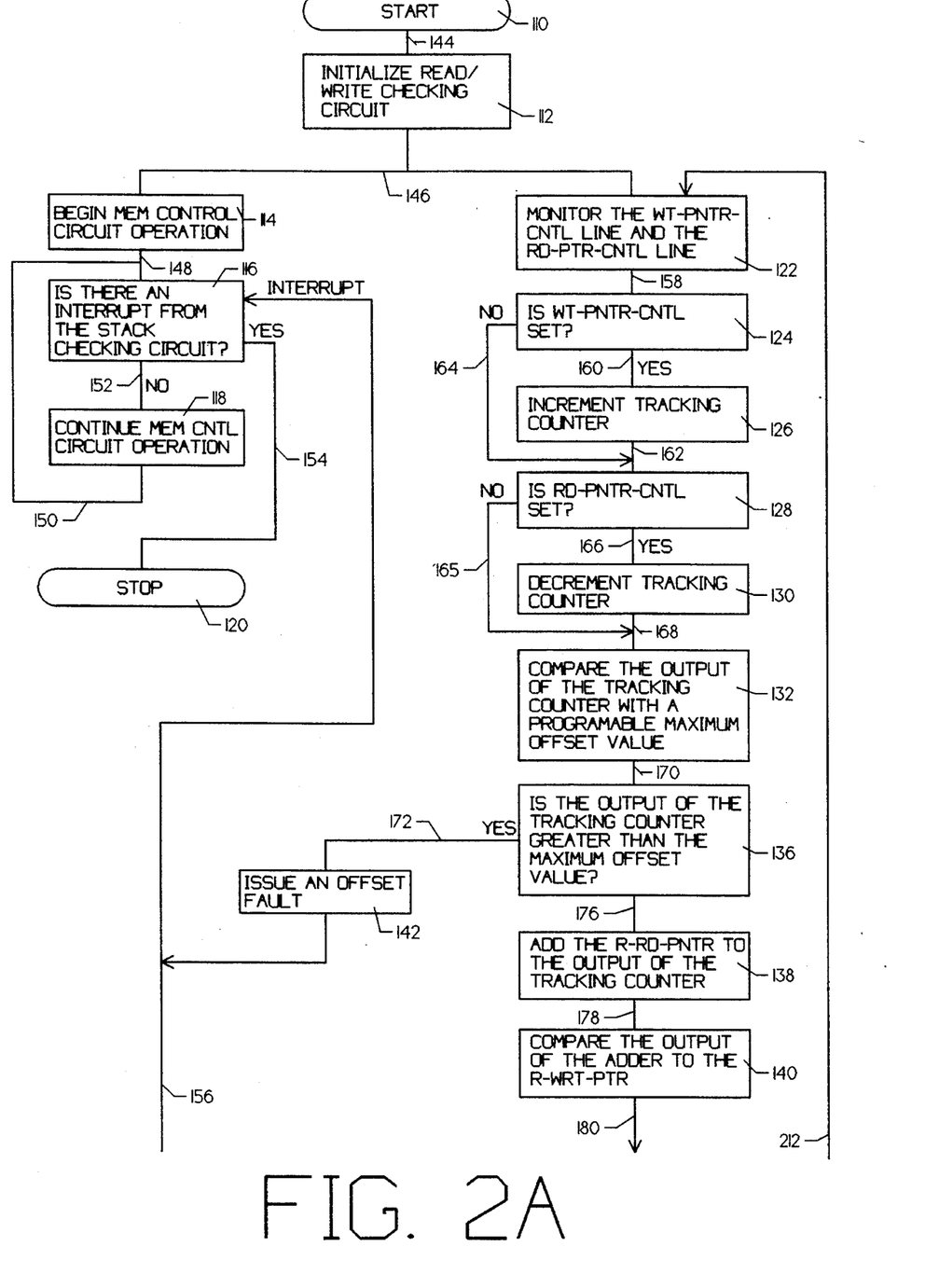
FIG. 2A is the first of two portions of a flow diagram illustrating the operation of the exemplary embodiment of the present invention shown in FIG. 1.
Figure 2B:
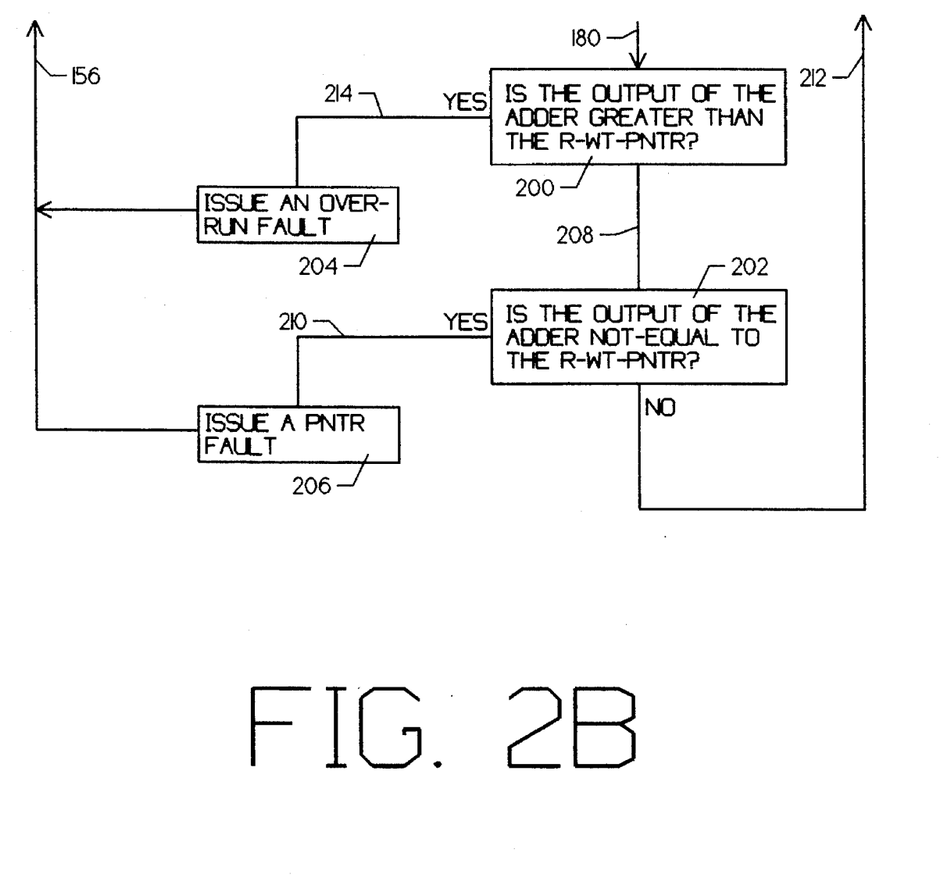
FIG. 2B is the second of two portions of the flow diagram illustrating the operation of the exemplary embodiment of the present invention shown in FIG. 1.

FIG. 2A is the first of two portions of a flow diagram illustrating the operation of the exemplary embodiment of the present invention as shown in FIG. 1. FIG. 2B is the second of two portions of the flow diagram illustrating the operation of the exemplary embodiment of the present invention as shown in FIG. 1.

The algorithm is entered at start block 110 and control is passed to block 112 via interface 144. Block 112 initilizes the read/write circuitry with predetermined values. Block 112 is coupled to block 114 via interface 146. Block 114 initiates the memory control circuit operation including MEM-CTRL 27 (see FIG. 1). MEM-CTRL 27 may be coupled to, and controlled by, other circuitry such as a microprocessor (not shown).

Block 114 is coupled to block 116 via interface 148. Block 116 determines whether there is an interrupt or fault signal from the stack checking circuitry of the present invention. If there is not an interrupt signal detected, control is passed to block 118 via interface 152. Block 118 continues the memory control circuit operation and passes control back to block 116 via interface 150. This loop continues until an interrupt is detected by block 116. If there is an interrupt detected by block 116, control is passed to stop block 120 via interface 154. Stop block 120 exits the algorithm.

Referring back to block 112, control is simultaneously passed to block 122 and block 114 via interface 146. Block 122 monitors WT-PTR-CNTL 58 and RD-PTR-CNTL 60. Block 122 is coupled to block 124 via interface 158. Block 124 determines whether MEM-CNTL 27 set WT-PTR-CNTL 58 thereby incrementing the write pointer. If MEM-CNTL 27 did set WT-PTR-CNTL 58, control is passed to block 126 via interface 160. Block 126 increments a tracking counter. If block 124 determined that WT-PTR-CNTL 58 was not set, control is passed to block 128 via interface 164 bypassing block 126.

Block 128 determines whether PTR-CNTL 27 set RD-PTR-CNTL 60 thereby incrementing the read pointer. If block 128 determined that the read pointer was incremented, control is passed to block 130 via interface 166. Block 130 decrements the tracking counter. If block 128 determined that RD-PTR-CNTL 60 was not set by PTR-CNTL 27, control is passed to block 132 via interface 165 thereby bypassing block 130. Block 132 compares the output of the tracking counter with a programmable maximum offset value. Control is then passed to block 136 via interface 170. Block 136 determines whether the output of the tracking counter is greater than the maximum offset value. If it is, control is passed to block 142 via interface 172. Block 142 issues an offset fault and interrupt. The offset fault and interrupt are passed to block 116 via interface 156.

If block 136 determined that the output of the tracking counter is not greater than a maximum offset value, control is passed to block 138 via interface 176. Block 138 adds the read pointer to the output of the tracking counter. Control is then passed to block 140 via interface 178. Block 140 compares the output of the adder to the write pointer. Control is then passed to block 200 (see FIG. 2b).

Referring to FIG. 2b, block 200 determines whether the output of the adder in block 138 is greater than the value of the write pointer. If the output of the adder is greater than the value of the write pointer, control is passed to Block 204 via interface 214. Block 204 issues an over-run fault and interrupt to block 116 via interface 156.

Referring back to block 200, if the output of the adder is not greater than the write pointer, control is passed to block 202 via interface 208. Block 202 determines whether the output of the adder is equal to the value of the write pointer. If it is determined that the output of the adder is not equal to the write pointer, control is passed to block 206 via interface 210. Block 206 issues a pointer fault and interrupt to block 116 via interface 156.

Referring back to block 202, if the output of the adder is equal to the value of the write pointer, control is passed back to block 122 (see FIG. 2a) via interface 212. The loop from block 122 to block 202 is continued until an interrupt is issued by blocks 142, 204, or 206.

Figure 3:
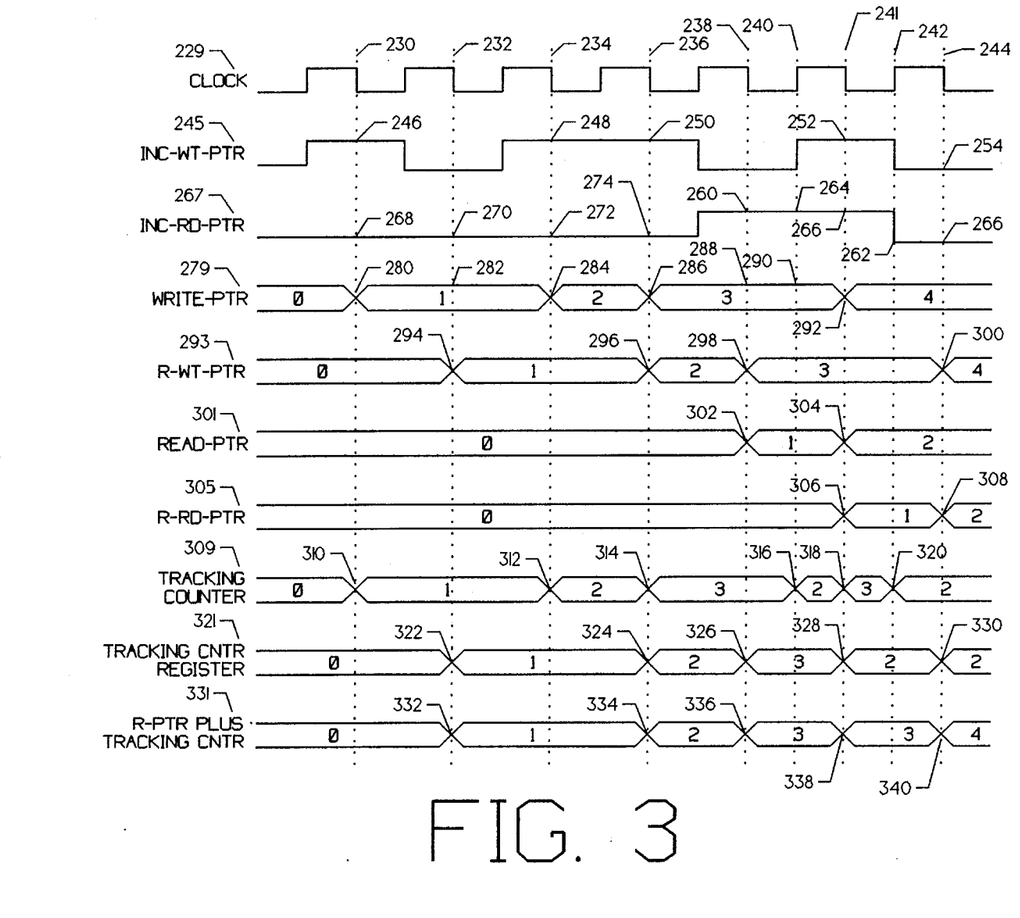
FIG. 3 is a timing diagram of the exemplary embodiment of the present invention shown in FIG. 1.

FIG. 3 is a timing diagram of the exemplary embodiment of the present invention shown in FIG. 1. The signal names listed on the left hand side of FIG. 3 correspond to the signal names in FIG. 1.

A plurality of clock pulses are shown on the clock signal 229. In the exemplary embodiment, all storage elements may be edged triggered devices. Flip-flop 18 controls INC-WT-PTR signal 245. Similarly, flip-flop 16 controls INC-RD-PTR signal 267. The particular wave forms for signals 245 and 267 in FIG. 3 are exemplary to help illustrate the functionality of the embodiment of FIG. 1.

A WRITE-PTR signal 279 is produced by WT-PTR 14. In the exemplary embodiment, WT-PTR 14 is triggered on the negative edge of the clock signal 229. The WRITE-PTR signal 279 is incremented from a logic-0 to a logic-1 at time 230 because INC-WT-PTR signal 245 is a logic-1 at point 246 indicating to WT-PTR 14 to increment the write pointer value. At time 232, WRITE-PTR signal 279 is not incremented at point 282 because INC-WT-PTR signal 245 is a logic-0 at time 232 thus indicating to WT-PTR 14 to not increment the write pointer value. At time 234, WRITE-PTR signal 279 is incremented from a logic-1 to a logic-2 because INC-WT-PTR signal 245 is a logic-1 at point 248. At time 236, WRITE-PTR signal 279 is incremented from a logic-2 to a logic-3 at point 286 because INC-WT-PTR 245 is a logic-1 at point 250. WRITE-PTR signal 279 is incremented from a logic-3 to a logic-4 at point 292 because INC-WT-PTR 252 is a logic-1 at point 252 indicating to WT-PTR 14 to increment the write pointer value.

The R-WT-PTR signal 293 is a delayed copy of WRITE-PTR signal 279. Points 280, 284, 286, and 292 of WRITE-PTR signal 79 correspond to points 294, 296, 298, and 300 of R-WT-PTR signal 293, respectively.

Read-PTR signal 301 is the output of RD-PTR 12 and is controlled by the INC-RD-PTR signal 267. Read-PTR signal 301 increments from a logic-0 to a logic-1 at point 302 because INC-RD-PTR signal 267 is a logic-1 at point 260. Read-PTR 301 increments from a logic-1 to a logic-2 at point 304 because INC-RD-PTR signal 267 is a logic-1 at point 266.

The R-RD-PTR signal 305 is a delayed copy of Read-PTR signal 301. Points 302 and 304 of Read-PTR signal 301 correspond to points 306 and 308 on R-RD-PTR signal 305, respectively.

The tracking counter signal 309 increments from a logic-0 to a logic-1 at point 310 because INC-WT-PTR signal 245 is a logic-1 at point 246. Tracking counter signal 309 increments from a logic-1 to a logic-2 at point 312 because INC-WT-PTR signal 245 is a logic-1 at point 248. Similarly, tracking counter signal 309 increments from a logic-2 to a logic-3 at point 314 because INC-WT-PTR signal 245 is a logic-1 at point 250.

Points 310, 312, and 314 of tracking counter signal 309 occur on the falling edge of clock signal 229. The falling edge of clock signal 229 represents the beginning of the second half of the clock cycle. The tracking counter signal 309 decrements from a logic-3 to a logic-2 at point 316 because INC-RD-PTR signal 267 is a logic-1 at point 264. This transition occurs at time 240 on the rising edge of the clock signal 229. At time 241, on the following edge of clock signal 229, tracking counter signal 309 is incremented from a logic-2 to a logic-3 at point 318 because INC-WT-PRT signal 245 is a logic-1 at point 252. Therefore, tracking counter signal 309 is decremented during the first half of the clock cycle, and incremented during the second half of the clock cycle. Finally, tracking counter signal 309 is decremented from a logic-3 to a logic-2 at point 320 because INC-RD-PTR signal 267 is a logic-1 at time 242.

A tracking counter register signal 321 is clocked on every falling edge of clock signal 229 thereby capturing the value of tracking counter signal 309 at these times. Tracking counter register signal 321 changes from a logic-0 to a logic-1 at point 322 because tracking counter signal 309 is a logic-1 at time 232. Tracking counter register signal 321 changes from a logic-1 to a logic-2 at point 324 because tracking counter signal 309 is a logic-2 at time 236. Tracking counter register signal 321 changes from a logic-2 to a logic-3 at point 326 because tracking counter signal 309 is a logic-3 at time 238. Tracking counter register signal 321 changes from a logic-3 to a logic-2 at point 238 because tracking counter signal 309 is a logic-2 at time 241. Tracking counter register signal 321 changes from a logic-2 to a logic-2 (no change) at point 330 because tracking counter signal 309 is a logic-2 at time 244.

The R-PTR PLUS TRACKING COUNTER signal 331 comprises the addition of the R-RD-PRT signal 305 and tracking counter register signal 321. Up to point 306 of R-RD-PTR signal 305, R-PTR PLUS TRACKING COUNTER signal 331 tracks tracking counter register signal 321. This is a result of having a logic-0 on R-RD-PTR 305 until point 306. However, at point 306 R-RD-PTR changes from a logic-0 to a logic-1. This results in a logic-3 at point 338 of R-PTR PLUS TRACKING COUNTER signal 331 because a logic-1 exists on R-RD-PTR signal 305 and a logic-2 exists on the tracking counter register signal 321 at time 241.

Similarly, R-PTR PLUS TRACKING COUNTER signal 331 changes from a logic-3 to a logic-4 at point 340. This occurs because a logic-2 exists on R-RD-PTR signal 305 and a logic-2 exists on the tracking counter register signal 321 at time 244.

The exemplary embodiment of the present invention has a comparator for comparing R-WT-PTR signal 293 with R-PTR PLUS TRACKING COUNTER signal 331. If the comparator determines inequality between these two signals, the comparator may issued a pointer fault. If the comparator determines that R-PTR PLUS TRACKING COUNTER signal 331 is greater than R-WT-PTR signal 293, the comparator may issue an over-run fault.

Having thus described the preferred embodiments of the present invention, those of skill in the art will readily appreciate that yet other embodiments may be made and used within the scope of the claims hereto attached.

I claim:

1. An apparatus for checking the integrity of a read pointer value stored in a read pointer register and a write pointer value stored in a write pointer register, the read pointer register and the write pointer register being coupled to a memory device and controlled by a number of control signals provided by a memory controller, comprising:

a. determining means coupled to the read pointer register and to the write pointer register for determining an expected difference between the read pointer value and the write pointer value, said determining means determining the expected difference by monitoring predetermined ones of the number of control signals provided by the memory controller;

b. adding means coupled to said determining means for adding the expected difference to the read pointer value and obtaining an expected write pointer value; and c. first comparing means coupled to said adding means and further coupled to the write pointer register for comparing the expected write pointer value to the write pointer value and for notifying the memory controller when the expected write pointer value does not have a predetermined relationship with the write pointer value.

2. The apparatus according to claim 1 wherein the predetermined relationship is equality.

3. The apparatus according to claim 1 wherein said first comparing means further notifies the memory controller when the expected write pointer value is greater than the write pointer value.

4. The apparatus according to claim 3 further comprising:

d. maximum offset means for transmitting a maximum offset value;

e. second comparing means coupled to said determining means and to said maximum offset means for comparing the expected difference to the maximum offset value and for indicating to the memory controller when the expected difference is greater than the maximum offset value.

5. An apparatus according to claim 1 wherein said determining means comprises an up/down tracking counter.

6. An apparatus for checking the integrity of a read pointer value stored in a read pointer register and a write pointer value stored in a write pointer register, the read pointer register and the write pointer register being coupled to a memory device and controlled by a number of control signals provided by a memory controller, comprising:

a. a determining circuit coupled to the read pointer register and to the write pointer register providing an expected difference between the read pointer value and the write pointer value, said determining circuit determining the expected difference by monitoring predetermined ones of the number of control signals provided by the memory controller;

b. an adder circuit coupled to said determining circuit for adding the expected difference to the read pointer value and obtaining an expected write pointer value; and c. a first comparator circuit coupled to the adder circuit and further coupled to the write pointer register for comparing the expected write pointer value to the write pointer value and for notifying the memory controller when the expected write pointer value does not have a predetermined relationship with the write pointer value.

7. An apparatus according to claim 6 wherein said first comparator circuit further notifies the memory controller when the expected write pointer value is greater than the write pointer value.

8. An apparatus according to claim 7 further comprising:

d. maximum offset means for transmitting a maximum offset value;

e. a second comparator circuit coupled to said determining circuit and to said maximum offset means for comparing the expected difference to the maximum offset value and for indicating to the memory controller when the expected difference is greater than the maximum offset value.

9. An apparatus according to claim 6 wherein said determining circuit comprises an up/down tracking counter.

10. An apparatus for checking the integrity of a read pointer value and a write pointer value, comprising:

a. a write pointer generation circuit coupled to a memory device and further to a memory controller, said write pointer generation circuit storing the write pointer value, said write pointer generation circuit having a write increment input whereby a predetermined logic level imposed on said write increment input causes said write pointer generation circuit to increment the write pointer value, said write increment input being coupled to the memory controller;

b. a read pointer generation circuit coupled to the memory device and further to the memory controller, said read pointer generation circuit storing the read pointer value, said read pointer generation circuit having a read increment input whereby a predetermined logic level imposed on said read increment input causes said read pointer generation circuit to increment the read pointer value, said read increment input being coupled to the memory controller;

c. a first dual data flip-flip having a first storage element, a second storage element, and an output wherein said first storage element and said second storage element have an enable input and a data input, said data input of the first storage element is coupled to said read increment input of said read pointer generation circuit and said enable input of said first storage element is coupled to a first enable input port, said data input of the second storage element is coupled to a predetermined voltage and said enable input of said second storage element is coupled to a second enable input port;

d. a second dual data flip-flop having a third storage element, a fourth storage element, and an output wherein said third storage element and said fourth storage element have an enable input and a data input, said data input of the third storage element is coupled to the write increment input of said write pointer generation circuit and the enable input of said third storage element is coupled to the second enable input port, said data input of the fourth storage element is coupled to a predetermined voltage and the enable input of said fourth storage element is coupled to the first enable input port;

e. an OR gate having a first input coupled to the output of said first dual data flip-flop and a second input coupled to the output of said second dual data flip-flop;

f. a tracking counter having an EN input and an up/down control input, said EN input is coupled to said OR gate and said up/down control input is coupled to the output of said second dual data flip-flop for tracking the difference between the read pointer value and the write pointer value, said tracking counter providing result signals;

g. a first register coupled to said tracking counter for storing said result signals of said tracking counter;

h. a second register coupled to said read pointer generation circuit for storing the read pointer;

i. a third register coupled to said write pointer generation circuit for storing the write pointer value;

j. an adder coupled to said first register and to said second register for adding said result signals of said tracking counter to said read pointer value, said adder providing result signals; and k. a first comparator coupled to said adder and to said third register for comparing said result signals of said adder with said write pointer value, said first comparator providing a pointer fault signal if said result signals of said adder are not equal to said write pointer value and an over-run fault if said result signals of said adder are greater than said write pointer value.

11. An apparatus according to claim 10 further comprising:

l. a maximum offset input port for transmitting a maximum offset value; and m. a second comparator coupled to said first register and to said maximum offset input port for comparing said maximum offset value with the contents of said first register, said second comparator providing an offset fault if the contents of the first register are greater than the maximum offset value.

12. A method for checking the integrity of a read pointer and a write pointer, the read pointer and the write pointer being provided to a memory device and controlled by a memory controller, comprising:

a. calculating and maintaining an expected difference between the read pointer and the write pointer;

b. adding the expected difference to the read pointer and obtaining an expected write pointer;

c. comparing the expected write pointer to the write pointer; and d. issuing a first fault to the memory controller if the expected write pointer does not equal the write pointer.

13. A method according to claim 12 further comprising:

e. issuing a second fault to the memory controller if the expected write pointer is greater than the write pointer.

14. A method for checking the integrity of a read pointer and a write pointer, the read pointer and the write pointer being coupled to a memory device and controlled by a memory controller, comprising:

a. monitoring a write pointer control line and a read pointer control line;

b. determining if the write pointer control line is set;

c. incrementing a tracking counter if the write pointer control line is set, said tracking counter providing a tracking counter value;

d. determining if the read pointer control line is set;

e. decrementing the tracking counter if the read pointer control line is set;

f. synchronizing the tracking counter value and the read pointer;

g. adding the tracking counter value of the tracking counter to the read pointer thereby producing a result; and h. comparing the result of the adding step (f) to the write pointer.

15. A method according to claim 14 further comprising:

h. issuing a over-run fault if the comparing step (g) determines that the result of the adding step (f) is greater than the write pointer; and i. issuing a pointer fault if the comparing step (g) determines that the result of the adding step (f) is not equal to the write pointer.

16. A method according to claim 15 further comprising:

j. comparing the contents of the tracking counter to a maximum offset value; and k. issuing an offset fault if the comparing step (j) determines that the contents of the tracking counter are greater than the maximum offset value.

17. An apparatus for checking the integrity of a read pointer value stored in a read pointer register and a write pointer value stored in a write pointer register, the read pointer register and the write pointer register being coupled to a memory device, the read pointer value being controlled by a memory controller via an increment read pointer signal and the write pointer value being controlled by the memory controller via an increment write pointer signal, comprising:

a. a tracking counter coupled to the memory controller, said tracking counter being incremented by the increment write pointer signal and decremented by the increment read pointer signal, said tracking counter providing an expected difference between the read pointer value and the write pointer value;

b. adding means coupled to said tracking counter for adding the expected difference to the read pointer value and providing an expected write pointer value; and c. first comparing means coupled to said adding means and further coupled to the write pointer register for comparing the expected write pointer value to the write pointer value and for notifying the memory controller when the expected write pointer value does not have a predetermined relationship with the write pointer value.

18. The apparatus according to claim 17 wherein said first comparing means compares the expected write pointer value to the write pointer value and notifies the memory controller when the expected write pointer value equals the write pointer value.

19. The apparatus according to claim 17 wherein said first comparing means further notifies the memory controller when the expected write pointer value is greater than the write pointer value.

20. The apparatus according to claim 17 wherein said adding means comprises an adder circuit.

21. The apparatus according to claim 17 wherein said first comparing means comprises a comparator circuit.

22. A apparatus according to claim 19 further comprising:

d. maximum offset means for transmitting a maximum offset value;

e. second comparing means coupled to said tracking counter and to said maximum offset means for comparing the expected difference to the maximum offset value and for indicating to the memory controller when the expected difference is greater than the maximum offset value.

\* \* \* \* \*